United States Patent [19]
Northeved et al.

[11] 3,780,368
[45] Dec. 18, 1973

[54] METHOD OF MARKING AND SUBSEQUENTLY LOCALIZING, INDENTIFYING AND RECORDING PHYSICAL OBJECTS

[75] Inventors: Allan Northeved, Bagsvoerd; Hans Vinter, Klampenbord, both of Denmark

[73] Assignee: Svejsecentralen, Glostrup, Denmark

[22] Filed: Feb. 19, 1971

[21] Appl. No.: 116,956

[30] Foreign Application Priority Data
Feb. 20, 1970 Denmark.............................. 857/70

[52] U.S. Cl...... 343/6.5 SS, 340/152 T, 340/258 C, 340/280
[51] Int. Cl.......................... G01s 9/56, G08b 21/00
[58] Field of Search................ 343/6.5 SS; 340/280, 340/408, 152 T, 258 C

[56] References Cited
UNITED STATES PATENTS
| | | | |
|---|---|---|---|
| 3,631,442 | 12/1971 | Fearon | 340/280 |
| 3,018,475 | 1/1962 | Kleist et al | 343/6.5 SS X |
| 3,169,242 | 2/1965 | Davis et al | 343/6.5 SS |
| 3,054,100 | 9/1962 | Jones | 343/6.5 SS |

Primary Examiner—Malcolm F. Hubler
Attorney—Watson, Cole, Grindle & Watson

[57] ABSTRACT

Physical objects within a group of such objects are all provided with identical electronic marking devices, each comprising a predetermined set, common to the group as a whole, of mutually independent electronic marking circuits, each marking circuit comprising a passive circuit for receiving electrical energy from a surrounding electromagnetic field and a circuit for transmitting electromagnetic signals in response to the reception of electrical energy in said receiving circuit. Each individual marking circuit is designed to radiate its own characteristic output signals and is selectively tuned only to do so when receiving its own characteristic input signals. Each marking circuit further contains at least one component which is destroyed or changed when the field intensity of the characteristic input signals exceeds a predetermined value. Each individual object is then separately coded by subjecting it to an electromagnetic coding field supplying a characteristic subcombination of input signals specific to the object in question and having a high enough field intensity so that a corresponding subcombination of marking circuits are selectively destroyed or changed. When later subjected to an electromagnetic searching field comprising the total combination of input signals for the common set of marking circuits, individual objects may be identified and recorded by means of the characteristic subcombination of output signals from the remaining, intact marking circuits, which identify the object in question according to a predetermined identification and coding system for the group of objects as a whole.

1 Claim, 19 Drawing Figures

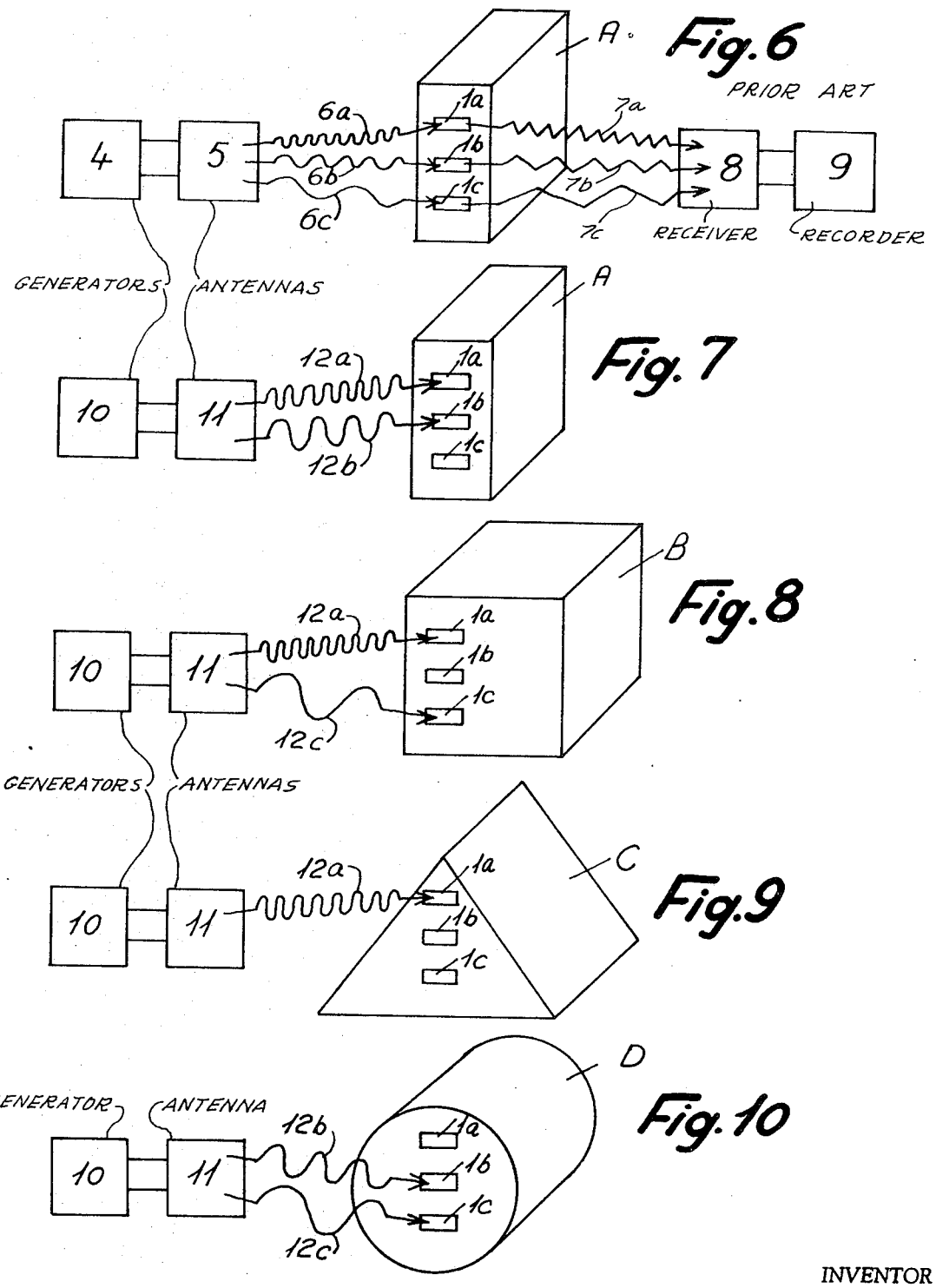

INVENTOR

BY

ATTORNEY

METHOD OF MARKING AND SUBSEQUENTLY LOCALIZING, INDENTIFYING AND RECORDING PHYSICAL OBJECTS

BACKGROUND OF THE INVENTION

This invention relates to a method of marking and subsequently identifying and recording physical objects.

Within a multitude of fields of research, industry, trade and other activities of a practical nature it is known to perform a marking of physical objects for the purpose of subsequently determining their location, identifying them individually, registering their presence at or passage through a certain locality, and recording and processing a characteristic information which is individually associated with each object.

From the wish to obtain the maximum security and speed and the best possible economy, the interest within these fields has particularly concentrated on automatized methods, which may more or less eliminate the human factor, and an increasing number of methods of this character are being used.

As a few typical examples from these fields, reference may be made to the known methods for the automatic sorting of mail and parcels, automatic production control, stock control and accounting, automatic checking and recording of sales in self-service shops, automatic reading, sorting and registration of documents of any kind including reading, sorting, totalling and registration of money bills, cheques and other means of payment, automatic reading and registering of credit cards, identity cards and other forms of personal legitimation certificates.

As a few typical examples from these fields, but of a more special character reference may be made to the known methods of automatic protection against theft of objects which unauthorized persons attempt at removing from confined areas, automatic time taking in sports matches and other measurements of speed, automatic traffic counting and traffic control on roads and railways, automatic time and performance control in places of work, and automatic recording of the location and movement of tracing elements in closed industrial processing plants.

Among the numerous known methods for the marking and subsequent registration of physical objects, the use of electronic marking circuits has been found to be an especially and universally applicable method within all the said fields of use.

In the prior art this method is carried out by applying at least one electronic marking circuit to each object, such marking circuit comprising a receiving circuit for receiving electrical energy from a surrounding electromagnetic field and a transmitting circuit for radiating electromagnetic signals, said receiving and transmitting circuits being so coupled to each other that electrical energy picked up by the receiving circuit produces a radiation of electromagnetic signals from the transmitting circuit, and picking up, amplifying and processing these signals in a signal receiving and processing equipment for such signals.

The term "electromagnetic field" as used in this specification should be understood to comprise both a field produced by radiation from an antennae system and an inductive field from a coil system.

Methods of this character and examples of electronic marking circuits that may be used are, e.g., described in the German Pat. specification No. 969,289 (burglary alarm, automatic locking systems, traffic counting, remote control of traffic signals, etc.), the French Pat. specification No. 1,231,939 (registration and control of road and railway traffic, sorting systems, production control, etc.), the German Pat. specification No. 1,274,392 (registration and control of railway traffic, stock control, etc.), the British Pat. specification No. 1,129,761 (burglary alarm), and the French Pat. specification No. 1,531,508 (automatic sorting systems for mail bags).

The known electronic marking circuits may be so tuned at their receiving side that they can only receive electrical energy from electromagnetic fields delivering special characteristic input signals, and may be so tuned on their transmitting side that they can only radiate special characteristic output signals. The individual object may therefore be marked with a set of mutually independent marking circuits representing a characteristic combination of input and/or output signals identifying the object in question and the individual information associated with the object (postal number, postage amounts, article numbers, article prices, cheque numbers, cheque amounts and the like) according to a predetermined identification and coding system.

The transmission of the electromagnetic signals to and from the electronic marking circuits may according to the known methods, if necessary, take place by means of correlated coil or antennae systems oriented in mutually different directions, whereby the signals are picked up with certainty even if the marking circuits happen to have an unfavourable orientation relative to one of the antennae employed.

In order to secure a transfer of electrical energy which is as efficient as possible either inductive transmitter-receiver coils or transmitter-receiver dipoles may be used depending on the employed range of frequency and strength.

In the prior art methods, the employed marking circuits may be either of the active type having a built-in source of energy or they may be of the passive type without a source of energy of their own, an electrical energy picked up by the receiving circuit constituting in itself the whole supply of energy to the transmitting circuit.

In the latter case it will be possible by means of the known technique for producing integrated circuits directly on common, inexpensive materials, such as plastics foil or paper, to construct the marking circuits so small and thin that they may on principle be built into a usual article marking label, a money bill, a cheque or postal cheque form, an ordinary credit card or an identification card, and even an ordinary postage stamp.

In a number of fields it is necessary at a later time again to remove the marking circuits from the marked objects which may be a tedious and time consuming process.

E.g. this is necessary in all cases where a marking which has been performed is subsequently found to be erroneous or for other reasons is to be removed at a later time, and it is likewise necessary in automatic burglary alarm systems every time an object is to be legally removed from the protected storage or sales area.

For this purpose, each individual object, after having been provided with one or more electronic marking circuits, may be subjected to an electromagnetic field supplying input signals of a so high field strength that at least one of the components of at least one of the marking circuits is changed in predetermined manner or destroyed by overloading and thereby changes or permanently interrupts the function of the marking circuit or circuits in question.

By so proceeding, a very simple method is made available for distorting or totally cancelling a marking information already applied to the object which in a subsequent checking of the marking is found erroneous or which for some other reason is to be cancelled without necessarily having to remove the marking circuits from the object. As an example, reference may be made to an erroneously coded article marking label, the marking information of which may just be cancelled or made inoperative by electromagnetic means before a correctly coded new article marking label is applied on top of it.

Moreover, a very simple method is made available for distorting or cancelling a marking information which is to be made inoperative after having been recorded without necessarily having to remove the marking circuits from the object. As an example, reference may be made to the possibility of employing the method according to the invention in a combined article registration and theft alarm system, where the marking information is electromagnetically cancelled in connection with the purchase of the article and payment of the price, but on the other hand automatically starts an alarm if an attempt is made of illegally removing the article from a certain confined display area.

A drawback of the known methods is that where a characteristic information is associated with each individual object within a group of individual objects it is necessary to produce and employ a correspondingly high number of mutually different sets of marking circuits.

Hereby the manufacturing expenses of marking circuits are so considerably increased that it is not possible to carry out a rational mass production at a unit price sufficiently low to permit a rpofitable employment of the method for the marking and registration of objects having a relatively low individual value and occurring in very high numbers.

At the same time the employment of the method in practice becomes expensive because the users must necessarily keep a great number of different sets in readiness for use and must keep complicated stocks of these, which becomes altogether prohibitive in the case of multi-digital information such as postal numbers, identity card numbers, prices of articles, check amounts, etc.

SUMMARY OF THE INVENTION

According to the invention each individual object within a group of objects is separately provided with a predetermined set of marking circuits common to the group as a whole, said set of marking circuits corresponding to a predetermined characteristic combination of input signals from an electromagnetic searching field, said combination being common to all the objects, whereafter each individual object is individually coded by being subjected to an electromagnetic coding field supplying a characteristic subcombination of input signals specific to the object and having a so high field strength that a corresponding subcombination consisting of marking circuits sensitive to exactly these signals is changed or made permanently inoperative, whereafter the individual object is subsequently identified and recorded by means of an electromagnetic searching field supplying input signals corresponding to the total combination of input signals for the common set of marking circuits employed, whereby the remaining, intact marking circuits are caused to transmit electromagnetic signals in a predetermined characteristic subcombination, which identifies the object in question according to a predetermined identification and coding system for the group as a whole.

By this method, the expenses of using the method in practice are drastically reduced because the relatively expensive sets of marking circuits, which would otherwise have to be manufactured individually for each object to be marked, can now be replaced by completely identical sets of marking circuits which may be employed for all objects within one or more groups and which can therefore be mass produced in very great quantities at a much lower unit price.

Moreover, the expenses of using the method in practice are drastically reduced because the user no longer has to have a great number of different sets of marking circuits in readiness for use, or to keep complicated stocks of these, but can instead just use one or a few types of universally applicable sets of marking circuits which may at any time be coded with individual information in the form of postal numbers, identity card numbers, prices of articles, cheque amounts, etc.

The invention virtually provides a universal system for employment of an "electronic combination lock" analogous to the known systems for the employment of mechanical combination locks where the prefabricated sets of associated marking circuits correspond to the prefabricated blanks for the mechanical keys, while the employment of the electromagnetic coding fields corresponds to the individual filing of each key, and the employed electromagnetic searching and receiving equipment corresponds to the mechanical combination lock which can only be opened by means of a correctly filed key.

However, the field of use of the "electronic combination lock" of the present invention is much more comprehensive than that of the mechanical combination lock, because the input and output signals of the electronic marking circuits may comprise a considerable additional amount of information which is directly and ideally suited for further processing in electronic processing equipment, electronically controlled sorting, recording and production equipment, for communication through electronic data transmission networks, etc.

BRIEF DESCRIPTION OF THE DRAWINGS

FIG. 6 is a schematic illustration of the steps of localizing, identifying and recording a physical object on which a set of electromagnetic marking circuits are provided, all of FIGS. 1 to 6 being representative of the prior art forming the basis of the invention, FIGS. 7, 8, 9 and 10 are schematic illustrations of the electromagnetic coding by the method according to the invention of a plurality of individual physical objects on which identical sets of electronic marking circuits are provided.

DESCRIPTION OF THE PREFERRED EMBODIMENTS.

Figure 1:
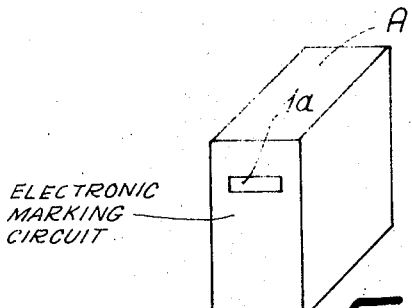
FIG. 1 is a diagrammatic illustration of a physical object, on which an electronic marking circuit is provided.

FIG. 1 illustrates schematically the marking of a physical object A by means of an electronic marking circuit 1a. The marking symbolizes on principle any expedient by means of which an electronic marking circuit may be associated with a physical object and caused follow this in space and time through a shorter or longer period, e.g., in the form of an external label or by providing the marking circuit in the interior of the object.

The object A symbolizes on principle a physical object of any kind including a physical object in the ordinary sense of the word or a group of interconnected or associated physical objects including physical organisms of living beings.

Figure 2:
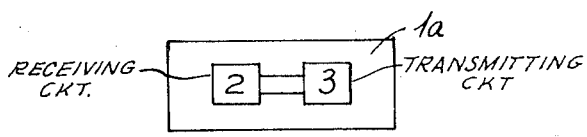
FIG. 2 is a schematic block diagram of an electronic marking circuit.

FIG. 2 schematically illustrates the employed electronic marking circuit 1a and on principle symbolizes any physical form of this circuit, e.g., made by enclosing the electronic circuits in a sealed capsule of plastics or other non-conductive material, or by building these into a label, money bill, printed form or the like of paper, plastics or other material.

The electronic marking circuit consists on principle of two electronic circuits which are coupled to each other: a receiving circuit 2 for receiving electrical energy from a surrounding electromagnetic field and a transmitting circuit 3 for radiating electromagnetic signals.

The receiving and transmitting circuits are coupled to each other in such a manner that an electrical energy picked up by the receiving circuit 2 causes electromagnetic signals to be radiated from the transmitting circuit.

The schematically illustrated block diagram symbolizes on principle any known practical construction of the said electronic circuits which may within the knowledge of a man skilled in the art be constructed in a multitude of different ways.

The schematically illustrated connection between the receiving and transmitting circuits symbolizes on principle any expedient by which an electrical energy picked up by the marking circuit 1a may in itself cause or initiate the transmission of electromagnetic signals from the marking circuit 3 in such a manner that this will operate as an "electromagnetic ecco."

The marking circuit 1a may in known manner be constructed as an "active" marking element having a built-in source of energy of its own in the form of an electric battery or the like supplying the required current and voltage to the transmitting circuit 3, or it may be constructed as a "passive" marking element in which an electrical energy picked up by the receiving circuit 2 in itself supplies all the necessary current and voltage to the transmitting circuit 3.

Finally the marking circuit 1a may in well known manner be so constructed or tuned that the receiving circuit 2 selectively can substantially only pick up electrical energy when it is struck by an electromagnetic field delivering predetermined characteristic input signals or predetermined characteristic combinations of such signals. Moreover, the transmitting circuit 3 may in well known manner be so constructed or tuned as only to emit predetermined characteristic output signals or combinations of such signals.

The expressions input signals and output signals as used in this specification are intended to comprise any kind and form of wireless electromagnetic signals. Thus, they may on principle have any strength and oscillating frequency and may be modulated in any known manner or may be subdivided into intermittent pulses or signals which may in well known manner be coded to represent any predetermined characteristic sum of information.

Figure 3:
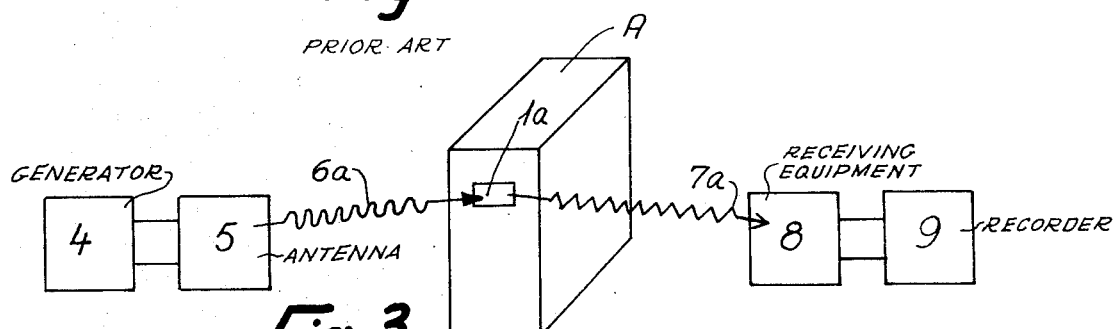
FIG. 3 is a schematic illustration of the steps of localizing, identifying and recording a physical object.

FIG. 3 schematically illustrates the later localization, identification and recording of the marked object A. By means of a generator 4 and an antennae system 5 associated therewith, an electromagnetic searching field is generated and is caused to strike the object A and to deposit electrical energy in the electronic marking circuit 1a.

The expression electromagnetic searching field, as used in this specification, is intended to comprise any known type and form of electromagnetic fields which may in a wireless manner deposit electrical energy in an electronic receiving circuit. Thus, the field may on principle have any strength and oscillating frequency and may be modulated in any known manner or may be subdivided into intermittent pulses or signals which may in well known manner be coded to represent any predetermined characteristic sum of information.

By means of the antennae system 5 the electromagnetic searching field may in well known manner be more or less confined in space or oriented so that it only strikes the marked object when this is present in a predetermined position or within a predetermined spatial zone.

The electromagnetic searching field and its frequency or content of characteristic input signals for the marking circuit is in the drawing schematically symbolized by a sinuous line 6a. By means of the input signals which may as mentioned be selectively adapted to the marking circuit 1a electrical energy is deposited therein whereby it is caused, as mentioned above, to emit electromagnetic signals which are characteristic of the relevant marking circuit 1a and which in the drawing are schematically symbolized by a zigzag line 7a.

The characteristic output signals 7a emitted from the marking circuit 1a are then picked up and amplified by means of a receiving equipment 8 for electromagnetic signals, whereafter they are analyzed, converted, recorded and further processed, as required, in any known manner in a recording equipment 9, which may, e.g., be a counting system for electronic pulses, a decoding equipment for converting the characteristic sum of information received to a visual reading system or to control pulses for machines and apparatus, an electronic data processing equipment for further processing the information received, or similar equipment, depending on the contemplated field of use.

Depending on the intended field of use the employed transmitting antennae system 5 and receiving equipment 8 may be combined to form a portable or stationary searching unit or they may in any known manner be suitably placed relative to one another, e.g., in the form of portable searching equipments for the manual tracing of freely movable objects, in the form of stationary antennae loops and the like built into production machinery, sorting systems, transport systems, reading units for legitimation certificates or other documents, combination locking systems, door and window frames or other delimitations of confined areas, or in any other suitable way relative to the expected or desired location of the object or objects A being searched.

When one or more marked objects A are subsequently present within or caused to pass through the area covered by the searching field 6a, a localization, identification and registration of the object or objects may be performed.

The expression localization, for the purposes of the present specification, is intended on principle to mean any form of ascertaining the spatial presence of one or more physical objects at one or more predetermined times, as well as ascertaining the time or times where one or more physical objects are present in predetermined spatial localities.

The expression identification is intended to mean any form of ascertaining or recognizing, by means of characteristic input and/or output signals of the electronic marking circuit, the identity of one or more physical objects or of the additional characteristic information which through the marking has been associated with the object or objects in question.

The expression registration or recording is intended to mean any form of preservation for a shorter or longer period of time of the characteristic information ascertained by the identification of one or more physical objects with a view to reading, storage or any other form of ultimate utilization.

When using the known methods for electronic marking it will often be advantageous to use more than one electronic marking circuit for marking each individual object. This is symbolically and schematically illustrated in FIG. 6, which shows the marking of a physical object A by means of a special set of mutually independent electronic marking circuits 1a, 1b and 1c.

The set consisting of three electronic marking circuits is only chosen as an illustrating example and on principle symbolizes any special set consisting of any number of individual marking circuits. As mentioned above, the individual marking circuits may be so constructed that each can only receive predetermined characteristic input signals or predetermined characteristic combinations of such signals and/or can only emit predetermined characteristic output signals or predetermined characteristic combinations of such signals.

FIG. 6 also schematically illustrates the subsequent localization, identification and recording of the marked object A. This takes place on principle in exactly the same manner as explained in connection with FIG. 3.

The input signal from the electromagnetic searching field, characteristic of each individual marking circuit 1a, 1b and 1c, is in the drawing schematically symbolized by the individually different sinuous lines 6a, 6b, 6c, which represent the mutual differences, e.g., in respect of strength, frequency, modulation or content of intermittent pulses or signals.

Similarly, the electromagnetic output signals, characteristic of each of the individual marking circuits 1a, 1b, 1c, are schematically symbolized by individually different zigzag lines 7a, 7b, 7c.

By using whole sets of electromagnetic marking circuits it is possible to perform a more comprehensive coding of these and thereby, in the marking of the individual physical object, to impress upon this a characteristic individual amount of information, which may on principle be made as large as desired by using a correspondingly high number of marking circuits.

Figure 4:
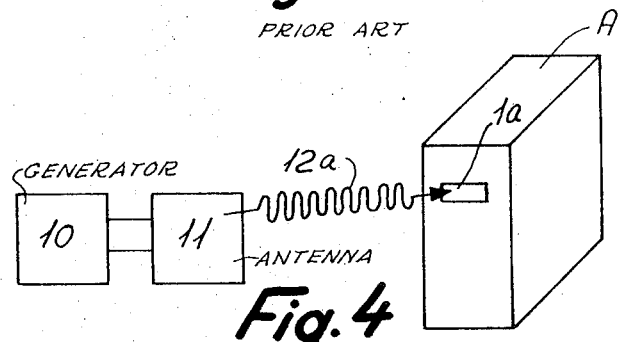
FIGS. 4 and 5 are schematic illustrations of a marked object, which is exposed to an electromagnetic field of so high intensity that the marking circuit is made permanently inoperative.

FIG. 4 shows a physical object A, which, after having been provided with an electronic marking circuit 1a, is exposed to an electromagnetic field which supplies input signals, schematically symbolized by the sinuous line 12a, having a so high field strength that at least one of the components of the marking circuit 1a is changed or destroyed by overloading and thereby changes or permanently interrupts the function of the marking circuit.

The electromagnetic field, which is produced by a conventional generator 10 and an antennae system 11, is caused to strike the object A and deposit electrical energy in the electronic marking circuit 1a.

The expression electromagnetic field, like in the case of the electromagnetic searching field described above, is intended to comprise any known type and form of electromagnetic fields which may in a wireless manner deposit electrical energy in an electronic receiving circuit. Thus, the field may on principle have any strength and oscillating frequency and may be modulated in any known manner or be subdivided into intermittent pulses or signals which may in well known manner be coded to represent any predetermined characteristic sum of information.

By means of the antennae system 11, the electromagnetic field may in well known manner be more or less confined in space or oriented so that it only strikes the marked object when this is present in a predetermined position or within a predetermined spatial zone.

In many uses of the method, it will be advantageous to let the generator 10 coincide with the previously mentioned generator 4 generating electromagnetic searching fields 6a and/or to let the antennae system 11 coincide with the previously mentioned antennae system 5. In this manner it is frequently possible to make the combined equipment simpler and less expensive, seeing that the emission of relatively weak electromagnetic searching signals 6a or of relatively strong electromagnetic cancelling signals 12a can then be controlled in well known manner by an amplitude control of the common generator 4, 10.

Depending on the contemplated field of use, the transmitting antennae system 11 or 5, 11 may as previously described be combined with a receiving equipment 8, 9 to form a portable or stationary unit, or may in any other known manner be suitably located relative to the receiving equipment, e.g., in portable systems for the manual tracing of freely moving objects, in the form of stationary antennae loops and the like built into production machinery, in sorting systems, transport systems, reading units for legitimation certificates or other documents, combination locking systems or in any other suitable way relative to the expected or desired location of the object or objects A, the electronic marking circuit 1a of which is to be changed or made permanently inoperative.

The marked physical object A may, as above described with reference to FIG. 3, be localized, identified and recorded when it is present within or is caused to pass through an electromagnetic searching field 6a by means of characteristic output signals 7a from the marking circuit 1a.

When the marked object A is thereafter, as schematically illustrated in FIG. 4, exposed to a relatively strong electromagnetic cancelling field 12a, the marking circuit 1a is changed or made permanently inoperative.

Figure 5:
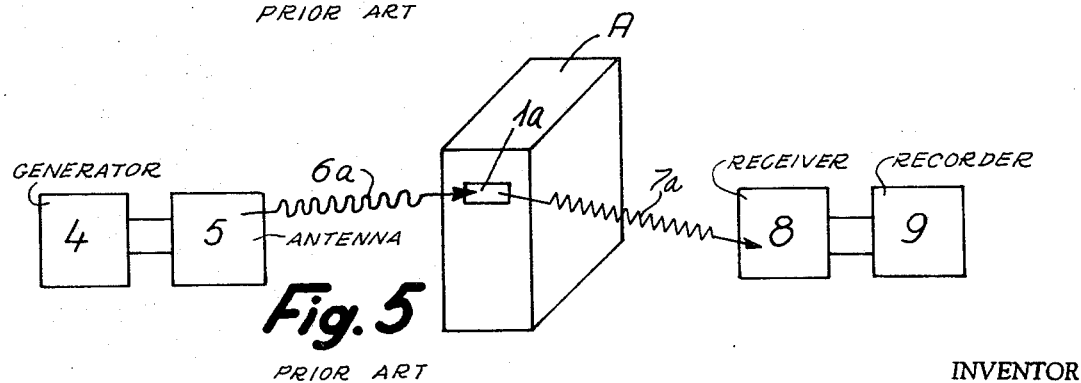

When the marked object A is then, as schematically illustrated in FIG. 5, again exposed to the same electromagnetic searching field 6a, the object will no longer be identified and recorded because the electromagnetic signals previously characteristic of the marking circuit 1a will no longer be radiated to the receiving equipment 8,9.

The cancellation principle described herein may be utilized in various ways. Thus, whenever an electronic marking of a physical object has taken place, this may, e.g., immediately thereafter be exposed to a suitable electromagnetic searching field for checking and securing the correct function of the employed marking circuit or marking circuits. If the marking is found to be erroneous, or if it is desired to cancel it for other reasons without having to remove the marking circuits from the object, this may be placed in an electromagnetic cancellation field which, as described above, may coincide with the searching field, only in amplified form, whereafter a new correct marking of the object may be performed without interference from the previous marking.

As a typical example, reference may be made to an erroneously placed or erroneously coded article marking label, the information of which may be changed or made inoperative by an electromagnetic signal, as described, before a new correctly coded article marking label is applied on top of it.

As another typical example, reference may be made to a combined system of sales registration and theft alarm, e.g., in a department store or a supermarket. All the goods displayed in a confined sales area are marked by labels or tags with built-in electronic marking circuits which may be constructed to give a single alarm signal common to them all, or may additionally deliver characteristic coded signals corresponding to category of goods, price, etc. The marking circuit may, if desired, be made very small and may be sewn or built into the goods in a manner such as to be completely concealed to the customers.

In the case of a normal purchase, the shop assistant or - in self service shops — the customer himself first places the article in an electromagnetic searching field, whereby the characteristic electromagnetic signals are transmitted to and/or from the marking circuit. These signals may be used in any known manner, e.g., for the automatic printing of a sales slip, automatic accounting in combination with a simultaneous automatic checking of the similarly electronically marked credit card of the customer, further processing in the data processing equipment of the business in connection with automatic sales accounting, stock accounting, stock control, etc., or for communication via a data transmission network for automatic entry on the bank or postal cheque account of the customer.

Immediately after the registration, the correct performance of which may be followed and checked on a conventional visual data display screen, the article is automatically exposed to an electromagnetic cancellation field that may be produced by simple amplification of the searching field, whereby the marking is changed or cancelled. When this has been checked by a final automatic use of the searching field, the customer can freely remove the article from the confined sales area.

All exits from the confined sales area are equipped with electromagnetic searching fields to the required extent so that any attempt of removing goods that have not been registered through a normal purchase automatically initiates a theft alarm or other protective operation of well known kind.

Similar procedures may be used in numerous other cases where it is desirable in an automatic combination locking system, an automatic sorting, control or registration system, etc., to use a disposable marking that need not be preserved or is not to be re-used.

As typical fields of this character, reference is made to mail and parcel sorting, where an automatic electromagnetic cancellation of the marking may preclude re-use of electronically marked stamps, etc., cheque and postal cheque registration with subsequent cancellation of coded amount information, permanent cancellation of legitimation certificates that are no longer valid, used admission cards and travel documents, etc., and all imaginable systems for automatic registration of goods, stock registration and stock control for pieces of goods, which, e.g., in the case of their return to the stock must not give rise to undesirable re-registration.

Within the field of automatically controlled sorting and production machinery, reference may e.g., be made to the possibility of marking an object to be handled by the machinery with a set of mutually different electronic marking circuits operating as a kind of electronic "punch card" representing the routing and handling of the object through the system. Each time the object arrives at an automatically controlled handling station, the characteristic marking information determining the process, to which the object is to be submitted at that station, is read. After the handling, one or more of the marking circuits are automatically modified or cancelled, whereafter the remaining combination of input and/or output signals of the marking circuits automatically control the further routing and handling of the object through the system.

Other related fields of use will directly present themselves to a man skilled in the art from a reading of the above explanations.

According to the invention the cancellation principle is utilized in a special manner for a new purpose, such as symbolically and schematically illustrated in FIGS. 6–14, which show a plurality of individual objects A, B, C and D, each of which is provided with a predetermined set of mutually independent electronic marking circuits 1a, 1b and 1c representative of the group. Each of the marking circuits is so constructed, in accordance with the principles described above, that it can selectively only pick up electrical energy from an electromagnetic field that contains the predetermined characteristic input signals corresponding to the marking circuit in question.

Thus, the illustrated set of marking circuits 1a, 1b and 1c, which runs through all of FIGS. 6–14, corresponds to a predetermined characteristic combination of input signals 6a + 6b + 6c from an electromagnetic searching field, said combination being common to all of the objects.

Similarly as described with reference to FIG. 6, a complex electromagnetic searching field 6a + 6b + 6c, and only such a field, will cause radiation of the total combination of output signals 7a + 7b + 7c characteristic of the employed set of marking circuits, whereafter these output signals are picked up, analyzed and registered by the receiving and registration system 8,9.

The schematically illustrated group consisting of four individual objects A, B, C and D, shown in FIGS. 7–10 and again in FIGS. 11–14, as well as the diagrammatically illustrated common set consisting of three marking circuits 1a, 1b and 1c are only selected as an example and on principle symbolizes any number of individual objects within a group, which are all marked with any common set consisting of any number of individual marking circuits.

FIGS. 7–10 schematically illustrate how each individual object A, B, C or D is thereafter, in similar manner as described with reference to FIG. 4, individually coded by being exposed to an electromagnetic coding field supplying a characteristic subcombination of input signals corresponding to the identity of the object and of a field strength so high that a corresponding subcombination consisting of the marking circuits responsive to exactly these signals is modified or made permanently inoperative.

The employed characteristic input signals from the electromagnetic coding field are in the drawing schematically symbolized by the individually different sinuous lines 12a, 12b and 12c, which symbolize the identity of configuration with the corresponding input signals 6a, 6b and 6c from the electromagnetic searching field, while at the same time illustrating that the coding fields have a higher field strength than the searching field.

FIG. 7 illustrates how the object A is individually coded by means of a subcombination of input signals 12a + 12b, which modify or permanently destroy the corresponding marking circuits 1a and 1b.

FIG. 8 similarly shows how the object B is individually coded by means of a different subcombination of input signals 12a + 12c, which modify or permanently destroy the corresponding marking circuits 1a and 1c.

FIG. 9 similarly shows how the object C is individually coded by means of a third subcombination of input signals 12a, which changes or destroys the corresponding marking circuit 1a, and finally FIG. 10 shows how the object D is coded by means of a fourth subcombination of input signals 12b + 12c, which change or permanently destroy the corresponding marking circuits 1b and 1c.

FIGS. 11–14 schematically illustrate how the objects A, B, C or D coded in the manner described are subsequently localized, identified and recorded individually by means of an electromagnetic searching field supplying input signals corresponding to the total combination of input signals 6a + 6b + 6c for the employed common set of marking circuits 1a, 1b and 1c, whereby the remaining intact marking circuits are caused to radiate electromagnetic signals in predetermined characteristic subcombinations, which identify the objects according to a predetermined identification and coding system for the group as a whole.

Figure 11:
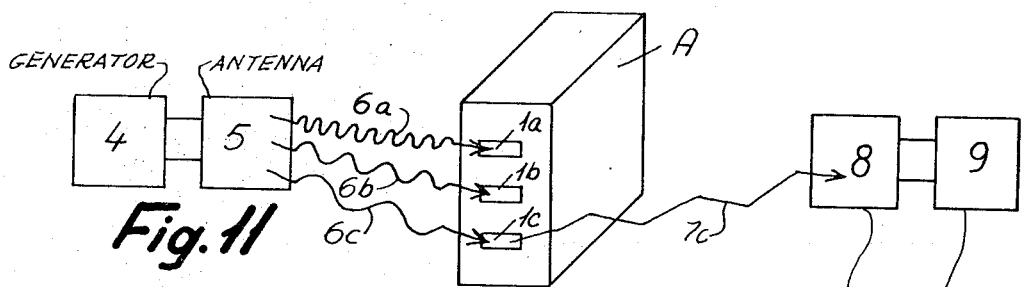
FIGS. 11, 12, 13 and 14 are schematic illustrations of the subsequent identification and recording of the individually coded objects.

FIG. 11 illustrates that in the searching operation the set of marking circuits on the object A now only radiate the characteristic subcombination of output signals 7c, which, e.g., corresponds to an identification of the object A by the binary code number 001.

Figure 12:
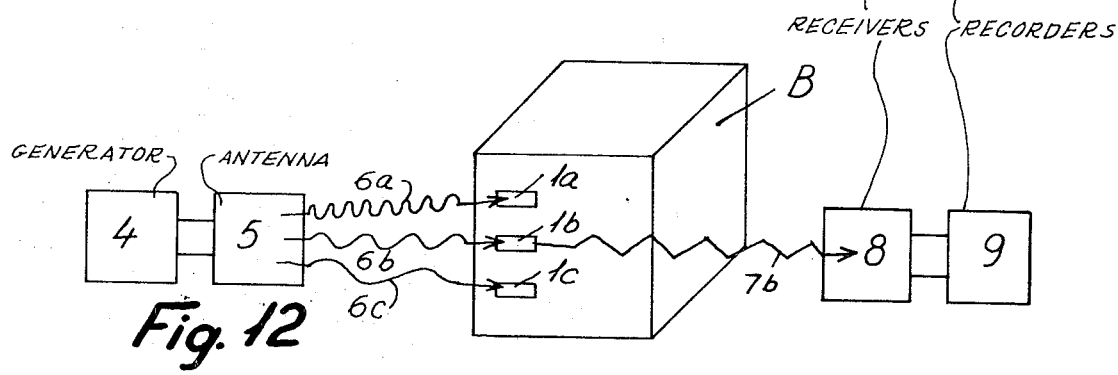

FIG. 12 similarly shows that in the searching operation the same set of marking circuits on the object B now only radiate the characteristic subcombination of output signals 7b which may, e.g., correspond to an identification of the object B by the binary code number 010.

Figure 13:
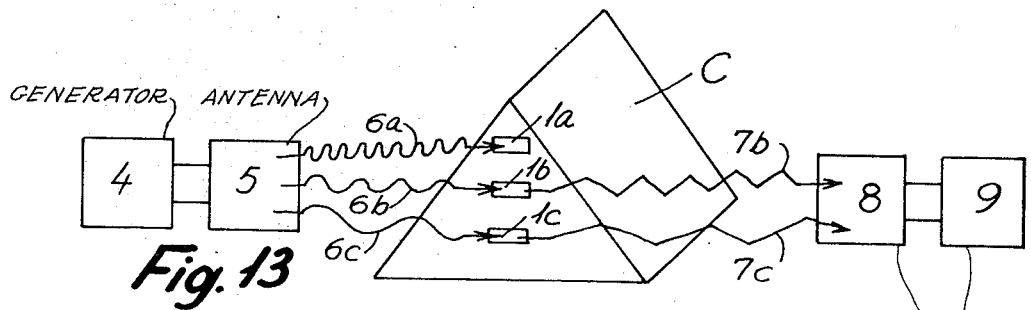
Figure 14:
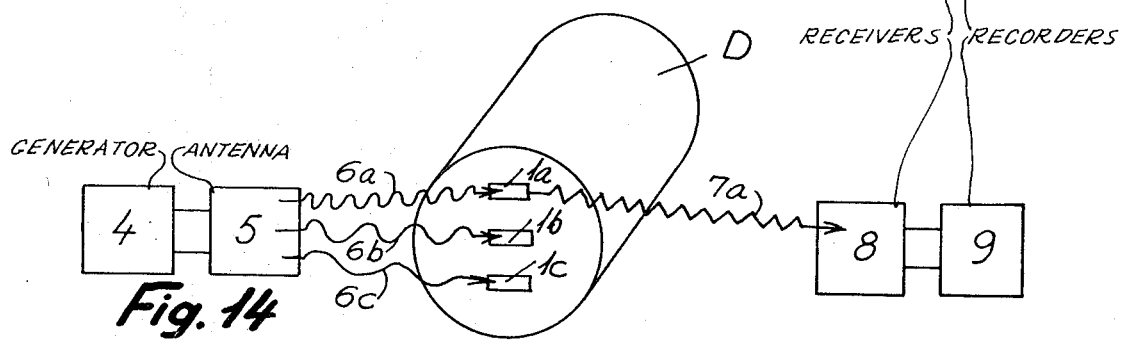

FIGS. 13 and 14 similarly show that in the searching operation the same set of marking circuits on the objects C and D now only radiate the characteristic subcombinations of output signals 7b + 7c and 7a respectively, corresponding to an identification of the objects C and D by the binary code numbers 011 and 100 respectively.

It is pointed out that the described employment of binary code numbers is only an illustrating example of a possible identification coding system. In carrying out the method, it is on principle possible to employ any system of identifying and of building up coding systems by means of electromagnetic signals. Thus, it is possible to use characteristic combinations of input and/or output signals to and from each individual marking circuit of the employed set, to code in letter symbols and to code in other than the binary system of numbers.

FIGS. 6–14, in combination with the above explanations, illustrate the basic general principles of carrying out the method of the invention.

In carrying out the invention there will normally be a relatively great number of objects, which are all provided with identical sets of electronic marking circuits characteristic of the group as such.

In practice, it will frequently be contemplated to use identical sets, each consisting of a relatively great number of electronic marking circuits so that, depending on the field of use in each case, a considerable individual amount of information may be associated with each physical object.

The principles of the method according to the invention will, however, always be the same: individual coding of objects that have in advance been uniformly electronically marked, by means of relatively strong electromagnetic coding fields comprising corresponding individually characteristic subcombinations of input signals, followed by a search by means of a relatively weak electromagnetic searching field comprising all the input signals of the full combination, whereby the individual objects manifest themselves individually through the remaining characteristic combination of output signals from the electronic marking circuits.

By the provision of the above explained possibility of marking a great number of physical objects with identical mass produced sets of electronic marking circuits, and the possibility of thereafter at any time assigning any characteristic information to the individual objects by electromagnetic radiation, a basis has been created for an additional wide range of obvious extensions and improvements of the use of electronic marking in general.

Figure 19:
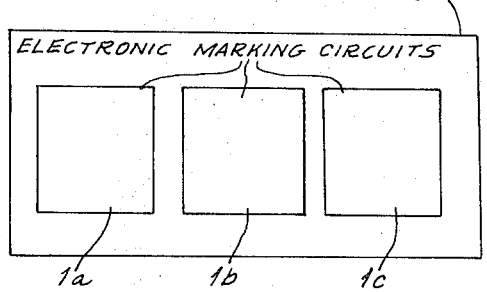
FIG. 19 is a schematic illustration of an electronic marking device comprising a set of mutually independent marking circuits.

In fact, a universal system has been provided for employing a kind of "electronic combination lock" analogous to the known systems of using mechanical combination locks, but with the additional advantage that the employed sets of electronic marking circuits, besides including the "key code" for the "combination lock," may include a considerable additional amount of information in a form which is directly and ideally suitable for further processing in electronic data processing equipment, electronically controlled sorting, registration and production systems, communication through electronic data transmission network, etc., It will be realized that the proposed system of coding opens up the possibility of manufacturing marking devices comprising sets of marking circuits having a high information storage capacity in mass production at a low price, e.g., in the form of blanks, stamps, labels, tags, forms, etc., and subsequently individually coding these by an inexpensive electromagnetic procedures, that may be performed at any time and place, whereby the field of use of electronic marking is enormously widened. FIG. 19 schematically illustrates such a complete electronic marking device 32 symbolizing a marking label, a credit card, an identification card, etc., containing a set of mutually independent marking circuits according to the invention. In fact when this technique is combined with advanced techniques of producing electronic circuits of ever decreasing size at ever decreasing price, of communicating and processing data, and of utilizing coded information for automatic checking, control, recording, etc., entirely new perspectives are opened up for the simplification and automatization of functions within practically all fields of human activity.

Figure 15:
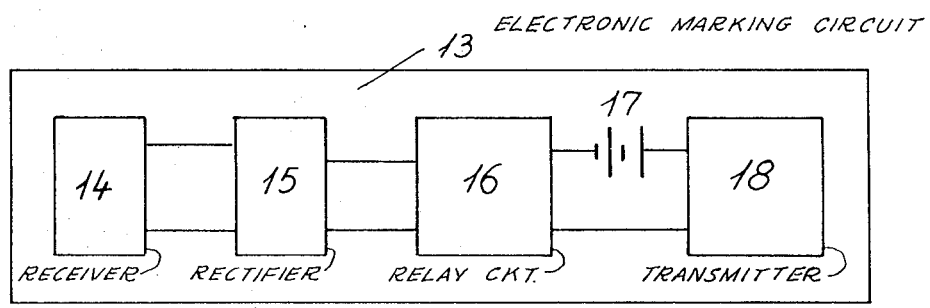
FIG. 15 is a schematic block diagram of an electronic marking circuit with a built-in source of energy.

FIG. 15 is a schematic block diagram of an electronic marking circuit 13 with built-in energy supply 17. The electronic marking circuit consists of a receiving circuit 14 for receiving electrical energy from a surrounding electromagnetic field and a transmitting circuit 18 for radiating electromagnetic signals. These two circuits are so connected to the source of energy 17 in the form of an electric battery or the like, if necessary through a rectifier circuit 15 and a separate relay circuit 16, that an electrical energy picked up by the receiving circuit opens up the supply of energy to the transmitting circuit and thereby produces a radiation of electromagnetic signals therefrom, the source of energy being again interrupted when electrical energy is no longer received by the receiving circuit.

Figure 16:
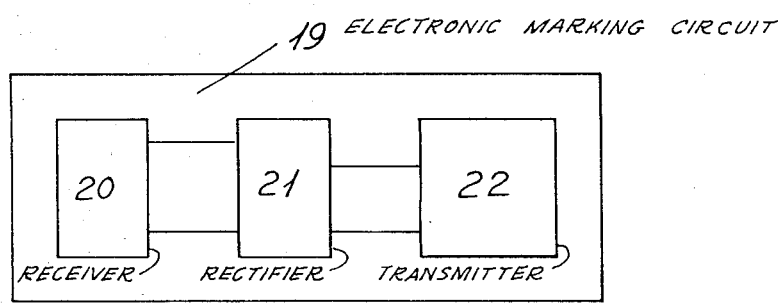
FIG. 16 is a schematic block diagram of an electronic marking circuit without a built-in source of energy.

FIG. 16 is a corresponding schematic block diagram of an electronic marking circuit 19 without a built-in source of energy. In this case, the electronic marking circuit only comprises a receiving circuit 20 for receiving electrical energy from a surrounding electromagnetic field and a transmitting circuit 22 for radiating electromagnetic signals, both of said receiving and transmitting circuits being non-powered. These two circuits are so interconnected, if necessary through a separate rectifier circuit 21, that the receiving circuit 20 at the same time constitutes an energy supply circuit for the transmitting circuit.

The receiving and transmitting circuits and the mutual connections between these may be produced in any manner known in the art of manufacturing electronic circuits, e.g., as printed or integrated circuits with use of a greater or smaller number of discrete components or as completely integrated circuits, e.g., by the known technique for manufacturing integrated circuits directly on plastics foil, paper or other simple materials.

According to the invention, each marking circuit comprises at least one component which is so constructed and dimensioned as to be changed in a predetermined manner or destroyed through overloading, when the marking circuit is struck by an electromagnetic field, the strength of which exceeds a predetermined value, thereby to change or permanently interrupt the function of the marking circuit.

Several of the components of an electronic marking circuit in the form of coils, resistors, diodes, capacitors, transistors, etc., and the connections between these can without difficulty be so dimensioned that they operate normally up to a predetermined maximum working voltage, but are overloaded and destroyed so as to cut off the passage of current when subjected to a voltage exceeding the said predetermined value, whereby the operation of the marking circuit is interrupted.

If it is alternatively only desired to change a marking circuit so that it will operate in a different manner, e.g., so that it will be capable of, or only capable of, receiving other input signals than previously, and/or will be capable of, or only capable of, transmitting other output signals than previously, one possibility is to employ series-connected tuning components, one or more of which are destroyed in the case of overloading, but many other possibilities are available to a man skilled in the art depending on the desired field of use of the method according to the invention.

Figure 17:
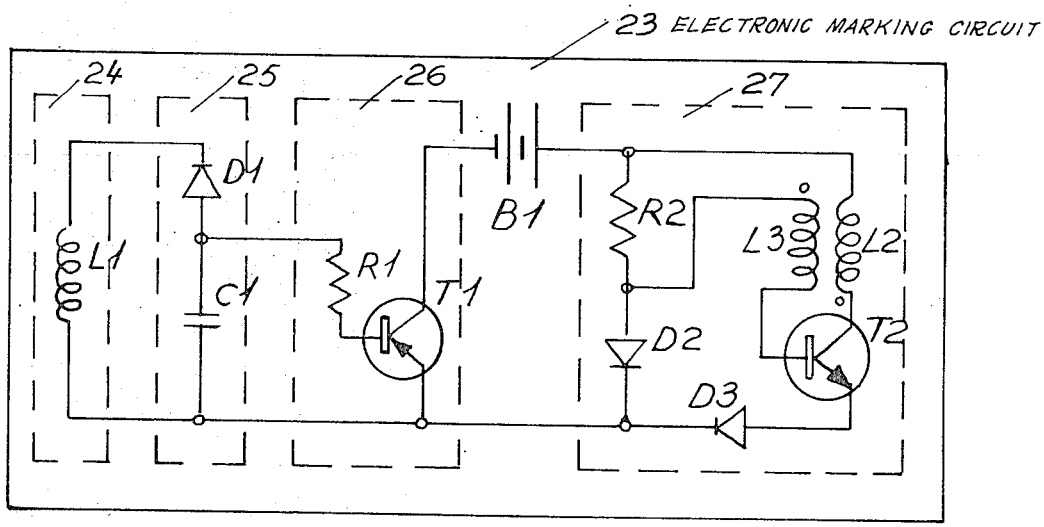
FIG. 17 is a somewhat more detailed schematic circuit diagram of one form of an electronic marking circuit with a built-in source of energy.

FIG. 17 shows in more detail one example of an electronic marking circuit 23 with a built-in source of energy B1. The circuit comprises a receiving circuit 24 containing a non-screened coil L1, and a transmitting circuit 27 in the form of an oscillator containing two coupled non-screened coils L2, L3, a transistor T2 and a resistor R2. For stabilizing the working point of the transistor so that this may operate with certainty at both high and low feeding voltages, two diodes D2, D3 are built into the oscillator circuit. The receiving circuit 24 and the transmitting circuit 27 are connected with each other and with an electric battery B1 through a rectifier circuit 25 consisting of a diode D1 and a capacitor C1, and a relay circuit 26 consisting of a transistor T1 and a resistor R1.

The described marking circuit operates as follows:

When the marking circuit is exposed to an electromagnetic field, a voltage is induced in the receiving circuit 24. Upon rectification in the rectifier circuit 21 the voltage opens up the passage of current in the relay circuit 26. Hereby the battery B1 is switched on and supplies feeding voltage to the transmitting circuit 27, which is thereby caused to radiate electromagnetic signals. The radiation is maintained as long as electrical energy is picked up by the receiving circuit and feeding voltage is thereby admitted to the transmitting circuit. When the marking circuit is no longer exposed to an electromagnetic field, the voltage drop across the rectifier circuit ceases. Thereby the battery circuit is cut off and feeding voltage is no longer applied to the transmitting circuit, whereby the radiation of electromagnetic signals is interrupted.

The diode D1 built into the rectifier circuit 25 is specially constructed and dimensioned in such a manner that it is destroyed and cuts off the passage of current and thereby permanently interrupts the operation of the marking circuit, when the electrical voltage induced in the receiving circuit exceeds a predetermined value.

Figure 18:
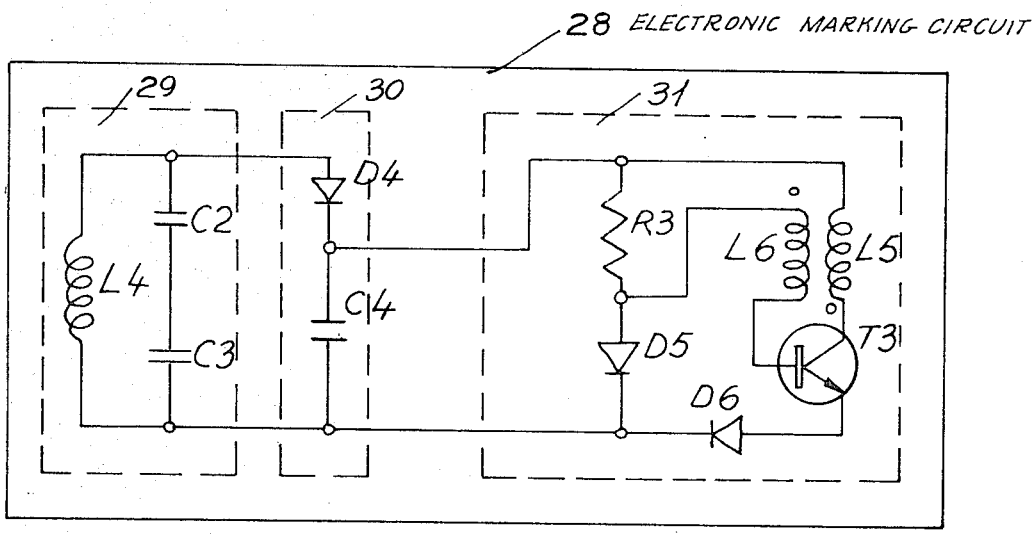
FIG. 18 is a somewhat more detailed schematic circuit diagram of one form of an electronic marking circuit without a built-in source of energy.

FIG. 18 shows one example of an electronic marking circuit 28 without a built-in source of energy. The circuit comprises a receiving circuit 29 containing a non-screened coil L4 and two series-connected capacitors C2, C3, and a transmitting circuit 31 in the form of an oscillator containing two coupled, non-screened coils L5, L6, a transistor T3 and a resistor R3. In order to stabilize the working point of the transistor such that the oscillator may operate with certainty at both high and low feeding voltages, two diodes D5, D6 are built into the oscillator circuit.

The receiving circuit 29 and the transmitting circuit 31 are mutually connected through a rectifier circuit 30 consisting of a diode D4 and a capacitor C4.

The described marking circuit operates as follows:

When the marking circuit is exposed to an electromagnetic field, a voltage is induced in the receiving circuit 29. Upon rectification in the rectifier circuit 30, this voltage serves as feeding voltage for the transmitting circuit 31 and causes electromagnetic signals to be radiated therefrom. The radiation is maintained exactly as long as electrical energy is picked up by the receiving circuit.

One, C2, of the tuning capacitors of the receiving circuit is specially constructed and dimensioned in such a manner that it is short-circuited and thereby admits current when the electrical voltage induced therein increases above a predetermined value. Thereby the tuning of the receiving circuit is permanently changed.

We claim:

1. A method of marking and identifying individual physical objects within a group of such objects, comprising the steps of:

marking all objects within said group with a common set of marking circuits, each marking circuit of the set radiating a characteristic electromagnetic output signal assigned thereto when subjected to an electromagnetic searching field including a characteristic input signal assigned thereto;

separately coding each individual object by a specific electromagnetic coding field including a characteristic subcombination of said input signals unique to the object in question and having a sufficient field intensity so that a characteristic of each of the subcombination of marking circuits to which said subcombination of input signals is assigned is permanently altered; and identifying the individual object by means of an electromagnetic searching field including the total combination of input signals for the common set of marking circuits employed for the group of objects whereby the marking circuits not altered by the coding field transmit electromagnetic signals in a predetermined characteristic residual subcombination which identifies the object according to the predetermined identification and coding system for a group of objects as a whole.

* * * * *